(12) United States Patent
Kondou

(10) Patent No.: US 7,825,185 B2
(45) Date of Patent: Nov. 2, 2010

(54) NATURAL RUBBER LATEX, NATURAL RUBBER, RUBBER COMPOSITION, AND TIRE USING THE SAME

(75) Inventor: Hajime Kondou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 319 days.

(21) Appl. No.: 10/537,698

(22) PCT Filed: Dec. 8, 2003

(86) PCT No.: PCT/JP03/15674

§ 371 (c)(1),
(2), (4) Date: Jun. 6, 2005

(87) PCT Pub. No.: WO2004/052936

PCT Pub. Date: Jun. 24, 2004

(65) Prior Publication Data

US 2006/0052518 A1  Mar. 9, 2006

(30) Foreign Application Priority Data

Dec. 6, 2002 (JP) ............................. 2002-355797
Dec. 6, 2002 (JP) ............................. 2002-355798

(51) Int. Cl.
*C08K 3/00* (2006.01)
(52) U.S. Cl. .................................. 524/575.5; 525/194
(58) Field of Classification Search .............. 524/575.5; 525/194
See application file for complete search history.

(56) References Cited

U.S. PATENT DOCUMENTS

| 6,344,499 | B1 * | 2/2002 | Kawamura et al. | ........... 523/166 |
| 2003/0109625 | A1 * | 6/2003 | Galimberti et al. | ........... 524/495 |
| 2004/0014876 | A1 * | 1/2004 | Ichikawa et al. | ......... 524/575.5 |

FOREIGN PATENT DOCUMENTS

| EP | 0 584 597 A | 3/1994 |
| EP | 1 149 902 A | 10/2001 |
| JP | 06-56902 A | 3/1994 |
| JP | 06-56906 A | 3/1994 |
| JP | 06-329838 A | 11/1994 |
| JP | 2002-348409 A | 12/2002 |

* cited by examiner

*Primary Examiner*—Peter D Mulcahy
(74) *Attorney, Agent, or Firm*—Sughrue Mion, PLLC

(57) ABSTRACT

The present invention provides natural rubber latex in which glucans being polysaccharides contained in the latex are decomposed by treating the natural rubber latex with an α- and/or β-glucan decomposing enzyme such as amylase and cellulose and in which non-rubber components are subjected to suited enzyme treatment, and it provides natural rubber which is maintained in physical properties such as revelation of strain induced crystallization, an accelerating effect, an antioxidant effect and a vulcanization-accelerating effect and which is improved particularly in an abrasion resistance and a low hysteresis loss property, a production process for the same and a rubber composition and a tire using such natural rubber.

7 Claims, No Drawings

US 7,825,185 B2

NATURAL RUBBER LATEX, NATURAL RUBBER, RUBBER COMPOSITION, AND TIRE USING THE SAME

TECHNICAL FIELD

The present invention relates to natural rubber latex, natural rubber, a rubber composition thereof and a tire using the same, and it further relates to a production process for such natural rubber.

BACKGROUND ART

In general, natural rubber is frequently used in many fields including industrial products such as tires, rubber belts, rubber rolls, bladders and fenders and sporting goods such as tennis balls, basket balls, soccer balls and volley balls. In a tire, it is used as a material for various components constituting rubber tires, such as treads, side walls, ply coating rubbers and bead fillers.

In recent years, enzyme treatment techniques for natural rubber have been proposed for the purpose of removing protein contained in natural rubber. A deproteinizing enzyme treatment technique with protease has so far been used as an enzyme treatment technique for natural rubber latex (refer to Japanese Patent Application Laid-Open No. 56902/1994 and Japanese Patent Application Laid-Open No. 56906/1994).

Protein is removed from natural rubber latex for the purpose of not only removing a substance which is a cause to bring about an allergic symptom but also improving the natural rubber.

Natural rubber is more excellent in mechanical characteristics than synthetic rubber and has small so-called tan δ (dynamic loss factor). Accordingly, natural rubber is excellent in a low hysteresis loss property, but it is desired to be improved in a gripping property in a wet state. Further, crude natural rubber (rubber used as a raw material) is inferior in processability and a productivity in the production. In order to solve such problems, a deproteinizing technique in which a total nitrogen content of a natural rubber is reduced to 0.1 mass % or less has been proposed (refer to Japanese Patent Application Laid-Open No. 329838/1994). In conventional deproteinizing treatments, natural rubber latex is repeatedly washed with surfactants, and washing thereof is accompanied with centrifugal process.

For example, anionic surfactants and/or nonionic surfactants can be used as a surfactant used for deproteinizing treatment. The anionic surfactants include, for example, surfactants of a carboxylic acid base, a sulfonic acid base, a sulfate base and a phosphate base.

On the other hand, non-rubber components of about 6 mass % such as a protein component are contained in natural rubber. Lipid, sugar, fibrous matters and inorganic compounds in addition to protein are included in the non-rubber components. Substances revealing strain induced crystallization and having an accelerating effect, an antioxidant effect and a vulcanization-accelerating effect are included in these non-rubber components and play a role to bring out the excellent characteristics of natural rubber. On the other hand, non-rubber components exerting an adverse effect on a low hysteresis loss property and an abrasion resistance are present as well.

Accordingly, various problems are brought about when natural rubber latex is subjected to conventional deproteinizing treatment.

For example, if a conventional deproteinizing technique is used to completely remove protein, a large part of non-rubber components including protein is removed as well, and the preferred effects described above are damaged. On the other hand, if the non-rubber components are left remaining as they are, brought about is the deficiency that an adverse effect remains on the rubber physical properties such as a low hysteresis loss property and an abrasion resistance even if the preferred characteristics described above are maintained. Accordingly, non-rubber components contained in natural rubber are desired to exhibit mainly preferred characteristics when the natural rubber is used for a rubber composition and a rubber product using it.

DISCLOSURE OF THE INVENTION

An object of the present invention is to provide natural rubber latex in which non-rubber components are subjected to enzyme treatment suited in terms of the characteristics of rubber, natural rubber which is maintained in physical properties such as revelation of strain induced crystallization, an accelerating effect, an antioxidant effect and a vulcanization-accelerating effect and improved in a low hysteresis loss property and/or an abrasion resistance, a production process for the same and a rubber composition and a tire using such natural rubber.

The present inventors have decomposed glucans which are polysaccharides contained in natural rubber latex by treating the latex with an α- and/or β-glucan decomposing enzyme such as amylase and cellulase. This makes it easy to flow out or remove non-rubber components such as glucans in a production step of natural rubber such as coagulation, a crepe and a shredder. They have found that such natural rubber and composition thereof are improved in a low hysteresis loss property and an abrasion resistance, and they have come to reach the present invention.

Further, They have found that surfactant treatment can be used in combination with such enzyme treatment of glucans in natural rubber latex, and they have come to reach the present invention.

That is, the natural rubber latex, the natural rubber and the rubber composition and the tire using the same according to the present invention are characterized by comprising the constitutions and the processes of the following items (1) to (14), and thus the problems described above are solved.

(1) Natural rubber latex in which glucans contained in the latex are decomposed.

(2) The natural rubber latex as described in the above item (1), wherein enzyme treatment with an α-glucan decomposing enzyme and/or β-glucan decomposing enzyme is carried out for the decomposition of glucans.

(3) The natural rubber latex as described in the above item (2), wherein the α-glucan decomposing enzyme is α-amylase.

(4) The natural rubber latex as described in the above item (2) or (3), wherein an addition amount of the α-glucan decomposing enzyme falls in a range of 0.005 to 0.5 mass part per 100 mass parts of the latex solid component.

(5) The natural rubber latex as described in the above item (2), wherein the β-glucan decomposing enzyme is cellulose.

(6) The natural rubber latex as described in the above item (2) or (5), wherein an addition amount of the β-glucan decomposing enzyme falls in a range of 0.005 to 0.5 mass part per 100 mass parts of the latex solid component.

(7) The natural rubber latex as described in any of the above items (2) to (6), wherein treatment with a surfactant is carried out in addition to the enzyme treatment.

(8) The natural rubber latex as described in any of the above items (2) to (7), wherein the enzyme treatment is carried out at a temperature of 70° C. or lower.

(9) A natural rubber obtained from the natural rubber latex as described in any of the above items (1) to (8).
(10) A rubber composition using the natural rubber as described in the above item (9).
(11) A tire characterized by using the rubber composition as described in the above item (10).
(12) A production process for natural rubber, wherein it is produced by subjecting natural rubber latex to enzyme treatment with an α-glucan decomposing enzyme and/or a β-glucan decomposing enzyme.
(13) The production process for natural rubber as described in the above item (12), wherein the enzyme treatment is carried out at a temperature of 70° C. or lower.
(14) The production process for natural rubber as described in the above item (12) or (13), wherein treatment with a surfactant is carried out in addition to the enzyme treatment.

As described above, in the present invention, components exerting an adverse effect in non-rubber components are removed by decomposing glucans comprising prescribed sugar and fibers such as prescribed cellulose contained in non-rubber components in natural rubber latex to make it possible to improve a low hysteresis loss property and an abrasion resistance of natural rubber and a rubber composition using it and sufficiently maintain revelation of strain induced crystallization, an accelerating effect, an antioxidant effect and a vulcanization-accelerating effect.

BEST MODE FOR CARRYING OUT THE INVENTION

The natural rubber latex, the natural rubber, the rubber composition, the tire using the same and the production process for the natural rubber according to the present invention shall be described below in details. However, the present invention shall not be restricted to the following embodiments.

In the natural rubber latex according to the present invention, glucans contained in the latex are decomposed. Natural rubber latex used as the raw material means field latex obtained from a natural rubber tree, and either of ammonia-treated latex which is commercially available and fresh field latex can be used for the latex.

Usually, non-rubber components are present in such natural rubber, and among them, glucans such as sugar components and vegetable fibers which exert an adverse effect on the rubber physical properties such as a low hysteresis loss property and an abrasion resistance are present as the non-rubber components. As long as these glucans are present in the latex, an adverse effect is exerted on the physical properties such as a low hysteresis loss property and an abrasion resistance of the rubber composition of the natural rubber and the rubber products thereof. Further, if non-rubber components are completely removed as is the case with conventional protein-removing techniques, it is likely that the revelation of strain induced crystallization and the accelerating effect are damaged and that the antioxidant effect and the vulcanization-accelerating effect are damaged as well. Accordingly, in the latex of natural rubber, mainly glucans contained in non-rubber components are preferably subjected to decomposition treatment. If such decomposition treatment is carried out, these glucans (decomposition products of sugar and fibrous matters) can be removed in the subsequent production step of natural rubber.

Latex which is subjected to enzyme treatment with an α- and/or β-glucan decomposing enzyme can be given as the natural rubber latex in which glucans are decomposed according to the present invention. The glucans are selectively decomposed in the latex.

The α- and/or β-glucan decomposing enzyme described above shall not specifically be restricted, and any of those originating in bacteria, fungous and yeast can be used. The α- and/or β-glucan decomposing enzyme are used in an amount of 100 (U/g) or more, preferably 1000 (U/g) or more, more preferably 10000 (U/g) or more and most preferably 40000 (U/g) or more.

α-Amylase, glucoamylase, pullulanase and dextranase can be given as the α-glucan decomposing enzyme described above, and α-amylase is particularly preferred. For example, Biozyme A (product manufactured by Amano Enzyme Co., Ltd.) which is a commercially available product can be given as amylase.

Further, cellulase and glucanase can be given as the β-glucan decomposing enzyme described above, and cellulase is particularly preferred. For example, Cellulase A "Amano" (product manufactured by Amano Enzyme Co., Ltd.) which is a commercially available product can be given as cellulase.

An addition amount of the α- and/or β-glucan decomposing enzyme (falling in a range of the foregoing active unit) described above in such enzyme treatment falls in a range of preferably 0.005 to 0.5 mass part, particularly preferably 0.01 to 0.2 mass part per 100 mass parts of the solid component contained in the natural rubber latex.

If the addition amount falls in the range described above, glucans contained in the natural rubber latex is suitably decomposed, and the good physical properties such as a low hysteresis loss property and an abrasion resistance which is the object are obtained. If an addition amount of the enzyme described above is less than the range described above, the decomposition reaction of the glucans is unsatisfactory, and therefore it is not preferred. On the other hand, if the addition amount exceeds the range described above, the enzyme reaction is sufficiently satisfied, and therefore further addition thereof is uneconomical and can not enhance the enzyme activity.

In the present invention, peptidase, pectinase, esterase, lipase and protease in addition to the enzymes described above can be used in combination.

Also, in adding such enzymes, capable of being used are other additives, for example, phosphates such as monopotassium phosphate, dipotassium phosphate and sodium phosphate, acetates such as potassium acetate and sodium acetate, acids such as sulfuric acid, acetic acid, hydrochloric acid, citric acid and succinic acid or salts thereof, ammonia, sodium hydroxide, potassium hydroxide, sodium carbonate and sodium hydrogencarbonate as a pH-controlling agent.

In the present invention, the enzyme treatment described above is carried out at a temperature of 70° C. or lower, preferably 60° C. or lower and more preferably 50° C. or lower.

If the enzyme treatment temperature described above exceeds 70° C., the natural rubber latex is reduced in a stability and solidified during the enzyme treatment. After coagulation, the decomposing effect with the enzyme is reduced. This makes it difficult to produce the natural rubber which is excellent in a low hysteresis loss property and an abrasion resistance.

The natural rubber latex according to the present invention is preferably treated with a surfactant in addition to the enzyme treatment described above. Nonionic surfactants, anionic surfactants, cationic surfactants and amphoteric surfactants can be used as the surfactant, and nonionic surfactants and anionic surfactants are particularly preferably used.

Suited as the nonionic surfactants are, for example, polyoxyalkylene ether base, polyoxyalkylene ester base, polyhydric alcohol fatty acid ester base, saccharide fatty acid ester base and alkylpolyglycoside base.

Suited as the anionic surfactants are, for example, carboxylic acid base, sulfonic acid base, sulfuric acid ester base and phosphoric acid ester base.

The carboxylic acid base surfactants include, for example, fatty acid salts, polyvalent carboxylic acid salts, rosin acid salts, dimer acid salts, polymer acid salts and tall oil fatty acid salts. The sulfonic acid base surfactants include, for example, alkylbenzenesulfonates, alkylsulfonates, alkylnaphthalenesulfonates, naphthalenesulfonates and diphenylethersulfonates. The sulfuric acid ester base surfactants include, for example, alkylsulfuric acid ester salts, polyoxyalkylenealkylsulfuric acid ester salts, polyoxyalkylenealkylphenylethersulfates, tristyrenated phenol sulfuric acid ester salts and polyoxyalkylenedistyrenated phenol sulfuric acid ester salts. The p phosphoric acid ester base surfactants include alkylphosphoric acid ester salts and polyoxyalkylenephosphoric acid ester salts.

The natural rubber latex subjected to the enzyme treatment in the manner described above is passed through a crepe and a shredder to be turned into a crumb after coagulated, and it is dried by means of a conventional dryer such as a vacuum dryer, an air dryer and a drum dryer after washed, whereby the natural rubber in the present invention can be obtained. In such latex treatment, non-rubber components can not completely be separated as is the case with conventional protein-treating techniques. Only glucans which are non-rubber components are separable and can be allowed to flow out or removed during the treatment.

In the rubber composition using such natural rubber according to the present invention, at least 5 mass % of the natural rubber described above based on the whole rubber component is preferably contained therein. If this amount is less than 5 mass %, the rubber composition having the desired physical properties is not obtained in a certain case. The preferred content of this natural rubber is 10 mass % or more.

The rubber component used in combination with the natural rubber described above includes a conventional natural rubbers and a diene base synthetic rubber, and the diene base synthetic rubber includes, for example, a styrene-butadiene copolymer (SBR), polybutadiene (BR), polyisoprene (IR), a butyl rubber (IIR), an ethylene-propylene copolymer and a mixture thereof.

A filler blended in the rubber component of the present invention shall not specifically be restricted, and capable of being used are compounds usually used in the rubber industry such as carbon black, silica, alumina, aluminum hydroxide, clay and calcium carbonate. Capable of being used as carbon black are, for example, carbon blacks of various grades such as SAF, HAF, ISAF, FEF and GPF. Further, silica shall not specifically be restricted, and wet silica, dry silica and colloidal silica are preferred. Such fillers can be used alone or in a mixture of two or more kinds thereof.

The total blending amount of such fillers falls in a range of preferably 30 to 120 mass parts, more preferably 40 to 80 mass parts per 100 mass parts of the rubber component.

The rubber component of the present invention can contain, if desired, various chemicals usually used in the rubber industry, for example, vulcanizing agents, vulcanization accelerator, process oils, antioxidants, scorching retarder, zinc oxide and stearic acid as long as the objects of the present invention are not damaged.

The rubber composition of the present invention can be used as well for uses in industrial products such rubber cushions, belts, hoses and others including uses in tires. In particular, it can suitably be used as a rubber for tires and can be applied to every tire member such as, for example, a tread rubber (including a cap rubber and a base rubber), a side wall, a ply coating rubber and a bead filler rubber.

EXAMPLES

The present invention shall be explained below with reference to examples, but the constitution of the present invention shall not be restricted to the following examples.

Production Process for Natural Rubber

Production Example 1

(1) Enzyme Treating Step of Natural Rubber Latex

Levenol WX (sodium polyoxyethylenealkylethersulfate: manufactured by Kao Corporation) 1.5 g as a surfactant and an amylase enzyme (Biozyme A: manufactured by Amano Enzyme Co., Ltd.) 0.15 g were added to 1000 g of latex obtained by adding water to natural rubber latex treated with clonal specie GT-1 and 0.4 wt % of $NH_3$ to control a solid content to 15 wt %, and the latex was stirred and dispersed. Then, it was left standing still for 15 hours.

(2) Coagulating and Drying Step

Next, formic acid was added to control pH of the latex to 4.7 to thereby coagulate the latex. This solid matter was passed through a creper five times and a shredder to be turned into a crumb, followed by drying at 110° C. for 210 minutes by means of a hot air dryer. The natural rubber thus obtained was designated as A.

Production Example 2

In Production Example 2, natural rubber was produced on the same conditions as in Production Example 1, except that in Production Example 1, an addition amount of the amylase enzyme was changed to 0.03 g. The natural rubber thus obtained was designated as B.

Production Example 3

In Production Example 3, natural rubber was produced on the same conditions as in Production Example 1, except that in Production Example 1, a cellulase enzyme (Cellulase A "Amano" 3: manufactured by Amano Enzyme Co., Ltd.) 0.15 g was substituted for the amylase enzyme. The natural rubber thus obtained was designated as C.

Production Example 4

In Production Example 4, natural rubber was produced on the same conditions as in Production Example 1, except that in Production Example 1, the cellulase enzyme (Cellulase A "Amano" 3: manufactured by Amano Enzyme Co., Ltd.) 0.03 g was substituted for the amylase enzyme. The natural rubber thus obtained was designated as D.

Comparative Production Example 1

In Comparative Production Example 1, latex was directly coagulated and dried without passing the enzyme treating step of the latex. The natural rubber thus obtained was designated as E.

Reference Production Example 1

In Reference Production Example 1, natural rubber was prepared in the same manner as in Production Example 1, except that the natural rubber latex was treated in a water bath at temperature of 80° C. in the enzyme treatment. The natural rubber thus obtained was designated as F.

The respective natural rubbers described above were used to prepare rubber compositions in compositions shown in the following Table 1, and the rubber compositions thus prepared were vulcanized on the conditions of a temperature of 145° C. and 33 minutes to obtain experimental rubbers.

TABLE 1

| Respective components of rubber compositions | Mass part |
|---|---|
| Natural rubber (respective examples) | 100 |
| Carbon black N339 | 50 |
| Aromatic oil | 5 |
| Stearic acid | 2 |
| Antioxidant 6C (*1) | 1 |
| Zinc oxide | 3 |
| Vulcanization accelerator DZ (*2) | 0.8 |
| Sulfur | 1 |

(*1) Antioxidant 6C: N-phenyl-N-1,3-dimethylbutyl-p-phenylenediamine
(*2) Vulcanization accelerator DZ: N,N-dicyclohexyl-2-benzothiazolysulfenamide The characteristics of the respective experimental rubbers were measured and evaluated by the following methods, and the results thereof are shown in Table 2.

Evaluation Methods (1) Mooney Viscosity of Compound (Rubber Composition)

The Mooney viscosity ($ML_{1+4}$/130° C.) was measured at 130° C. according to JIS K6300-1994. The smaller this value is, the more excellent the processability is.

(2) Physical Properties (a) Tensile Strength

The tension (Tb) in breaking was measured according to JIS K6301-1995.

(b) tan δ (Loss Factor)

A viscoelasticity-measuring apparatus (manufactured by Rheometrix Co., Ltd.) was used to measure tan δ (50° C.) at a temperature of 50° C., a distortion of 5% and a frequency of 15 Hz. The smaller the tan δ (50° C.) is, the lower the hysteresis loss property is.

(c) Abrasion Resistance (Index)

A Lambourn type abrasion tester was used to measure an abrading amount at a slipping rate of 60% at room temperature and shown by an index, wherein Comparative Production Example 3 was set to control (100). The higher the numerical value is, the better the abrasion resistance is.

TABLE 2

| | Natural rubber used | Compound Mooney viscosity ($ML_{1+4}$, 130° C.) | Tb (MPa) | tan δ | Abrasion resistance index |
|---|---|---|---|---|---|
| Example 1 | A | 57 | 27.5 | 0.169 | 102 |
| Example 2 | B | 59 | 27.2 | 0.171 | 101 |
| Example 3 | C | 59 | 27.1 | 0.194 | 141 |
| Example 4 | D | 60 | 27.4 | 0.193 | 137 |
| Comparative Example 1 | E | 65 | 27.3 | 0.196 | 100 |
| Reference Example 1 | F | 62 | 27.3 | 0.184 | 101 |

It can be found that Examples 1 and 2 in the present invention are excellent in a low hysteresis loss property without reducing an abrasion resistance as compared with Comparative Example 1. Further, it can be found that they are low in a compound Mooney viscosity and excellent in a processability. Also, it can be found that Examples 3 and 4 are excellent in an abrasion resistance without reducing a low hysteresis loss property as compared with Comparative Example 1. Further, it can be found that they are low as well in a compound Mooney viscosity and excellent in a processability.

As can be seen from the above, the natural rubber latex according to the present invention is latex in which glucans are decomposed, and it is subjected to enzyme treatment with an α- and/or β-glucan decomposing enzyme. Accordingly, the non-rubber components are subjected to enzyme treatment suited in terms of the characteristics of a rubber. Rubber products comprising natural rubber and a rubber composition using such latex, for example, tiers and the like are maintained in revelation of strain induced crystallization, an accelerating effect and an antioxidant effect and excellent in an abrasion resistance and a low hysteresis loss property. In addition thereto, the physical properties such as a vulcanization-accelerating effect in accelerating vulcanization are sufficiently maintained.

INDUSTRIAL APPLICABILITY

As described above, the natural rubber of the present invention is obtained by decomposing glucans contained in natural rubber latex by treating the latex with an α- and/or β-glucan decomposing enzyme such as amylase and cellulase. Natural rubber produced from such natural rubber latex is maintained in physical properties such as revelation of strain induced crystallization, an accelerating effect, an antioxidant effect and a vulcanization-accelerating effect and improved particularly in an abrasion resistance and a low hysteresis loss property, and therefore a rubber composition and a tire each having a high industrial applicability can be provided.

What is claimed is:

1. A natural rubber obtained from a natural rubber latex in which glucans contained in the latex are decomposed, wherein enzyme treatment with an α-amylase and/or a cellulase is carried out for the decomposition of the glucans, wherein only glucans which are non-rubber components are separable and removed.

2. A rubber composition using the natural rubber as described in claim 1.

3. A tire characterized by using the rubber composition as described in claim 2.

4. A production process for a natural rubber, wherein it is produced by subjecting a natural rubber latex to enzyme treatment with an a-amylase and/or a cellulase to decompose glucans contained therein, wherein only glucans which are non-rubber components are separable and removed.

5. The production process for a natural rubber as described in claim 4, wherein the enzyme treatment is carried out at a temperature of 70° C. or lower.

6. The production process for a natural rubber as described in claim 4, wherein treatment with a surfactant is carried out in addition to the enzyme treatment.

7. The production process for a natural rubber as described in claim 5, wherein treatment with a surfactant is carried out in addition to the enzyme treatment.

* * * * *